United States Patent
Song et al.

(10) Patent No.: US 8,121,208 B2
(45) Date of Patent: Feb. 21, 2012

(54) MULTI-INPUT MULTI-OUTPUT SYSTEM FOR ENHANCING TRANSMISSION PERFORMANCE

(75) Inventors: Young-Seog Song, Daejeon (KR); Seong-Rag Kim, Daejeon (KR); In-Kyeong Choi, Daejeon (KR); Choong-Il Yeh, Daejeon (KR); Seung-Joon Lee, Daejeon (KR); Hyoung-Soo Lim, Daejeon (KR); Kwang-Jae Lim, Daejeon (KR); Yu-Ro Lee, Daejeon (KR); Jong-Ee Oh, Daejeon (KR); Dong-Seung Kwon, Daejeon (KR); Seung-Ku Hwang, Seoul (KR); Chung-Yong Lee, Seoul (KR); Myeong-Cheol Shin, Seoul (KR)

(73) Assignees: Electronics and Telecommunications Research Institute, Daejeon (KR); Industry-Academic Cooperation Foundation, Yonsei University, Seoul (KR)

(*) Notice: Subject to any disclaimer, the term of this patent is extended or adjusted under 35 U.S.C. 154(b) by 542 days.

(21) Appl. No.: 11/667,711

(22) PCT Filed: Aug. 10, 2005

(86) PCT No.: PCT/KR2005/002592
§ 371 (c)(1),
(2), (4) Date: Jan. 3, 2008

(87) PCT Pub. No.: WO2008/052058
PCT Pub. Date: May 18, 2006

(65) Prior Publication Data
US 2008/0240276 A1    Oct. 2, 2008

(30) Foreign Application Priority Data

Nov. 12, 2004  (KR) .................. 10-2004-0092587

(51) Int. Cl.
*H04L 5/12*   (2006.01)
(52) U.S. Cl. ........................................ 375/262; 375/260
(58) Field of Classification Search .................. 375/262, 375/260
See application file for complete search history.

(56) References Cited

U.S. PATENT DOCUMENTS

| | | | |
|---|---|---|---|
| 2004/0136465 A1* | 7/2004 | Hwang et al. | 375/267 |
| 2004/0196919 A1* | 10/2004 | Mehta et al. | 375/267 |
| 2005/0068909 A1* | 3/2005 | Chae et al. | 370/278 |

OTHER PUBLICATIONS

"Per-antenna-rate-control (PARC) in frequency selective fading with SIC-GRAKE receiver" Grant, S.; Jung-Fu Cheng; Krasny, L.; Molnar, K.; Wang, Y.-P.E.; Vehicular Technology Conference, 2004. VTC2004-Fall. 2004 IEEE 60th Publication Year: 2004, pp. 1458-1462 vol. 2.*

* cited by examiner

*Primary Examiner* — Shuwang Liu
*Assistant Examiner* — Michael Neff
(74) *Attorney, Agent, or Firm* — Staas & Halsey LLP

(57) ABSTRACT

The present invention relates to a multi-input multi-output (MIMO) system for enhancing transmission performance. The MIMO system uses space-time encoding and transmit antenna selection methods, and includes a transmitter (100) and a receiver (200). The transmitter (100) includes N transmit antennas (130-1, 130-4) that are more than M transmit antennas (130-1, 130-3) used for transmitting a signal to space channel, selects the M transmit antennas (130-1, 130-3) among the N transmit antennas (130-3 130-4), and transmits symbol by space-time encoding the symbol. The receiver (200) includes M receive antenna (120-1, 210-2) for receiving a signal from the space channel, detects an information symbol by using the signal received through the receive antenna (210-1, 210-2), generates transmit antenna selection information for selecting M transmit antennas (130-1, 130-3) among transmit antennas (i30-1, . . . 7130-4) with reference to a channel estimate, and returns the information to the transmitter.

3 Claims, 5 Drawing Sheets

[Fig. 1]
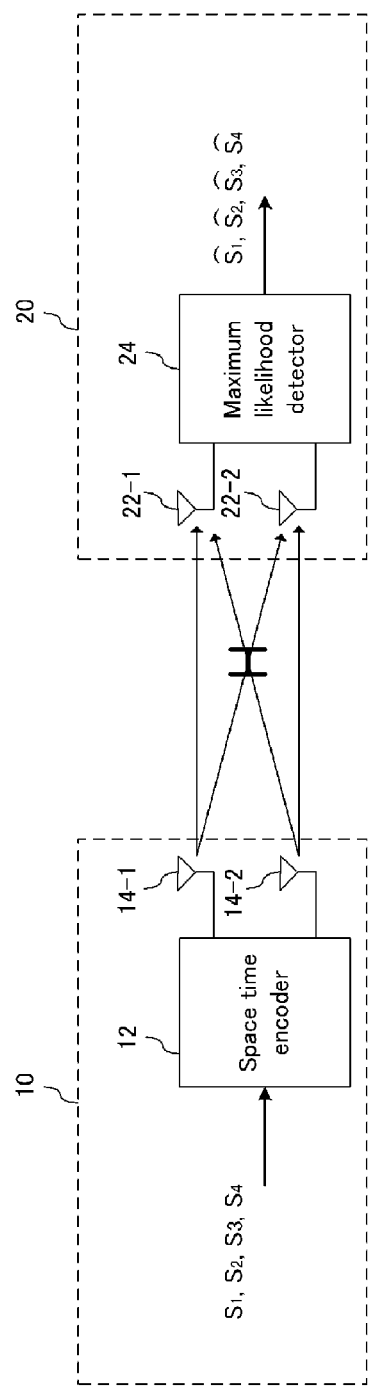

[Fig. 2]
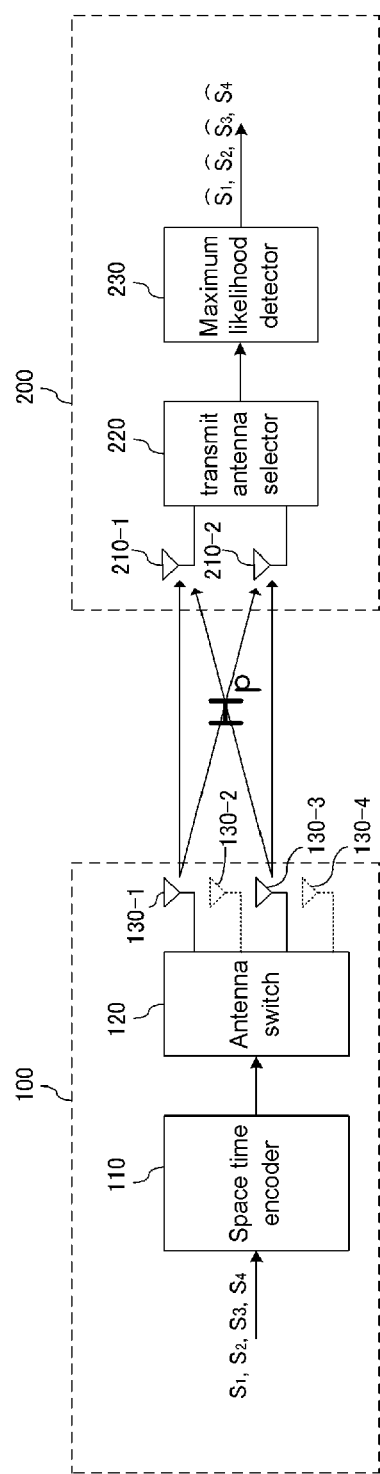

[Fig. 3]
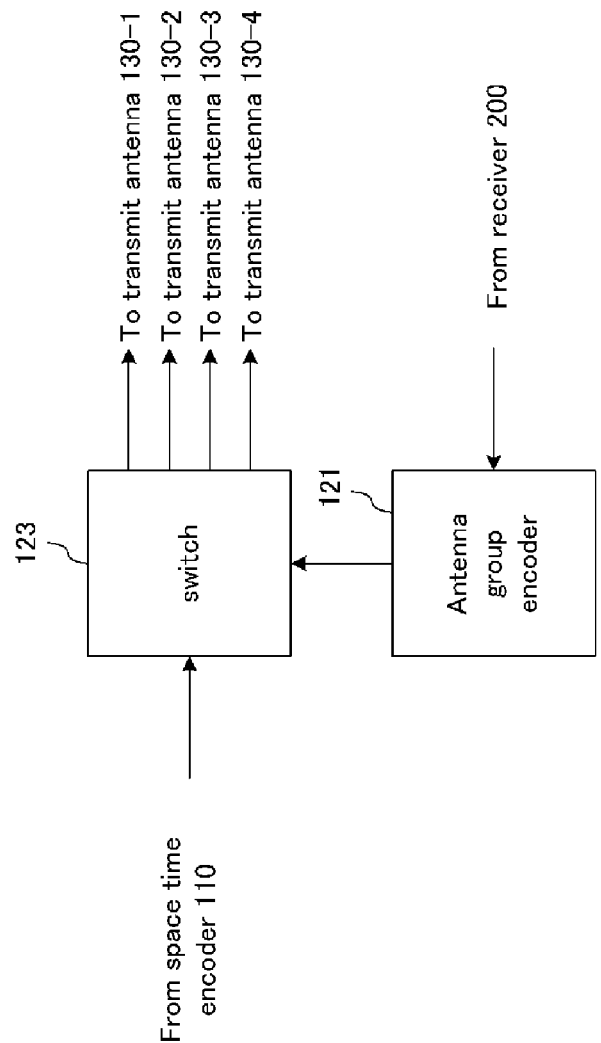

[Fig. 4]
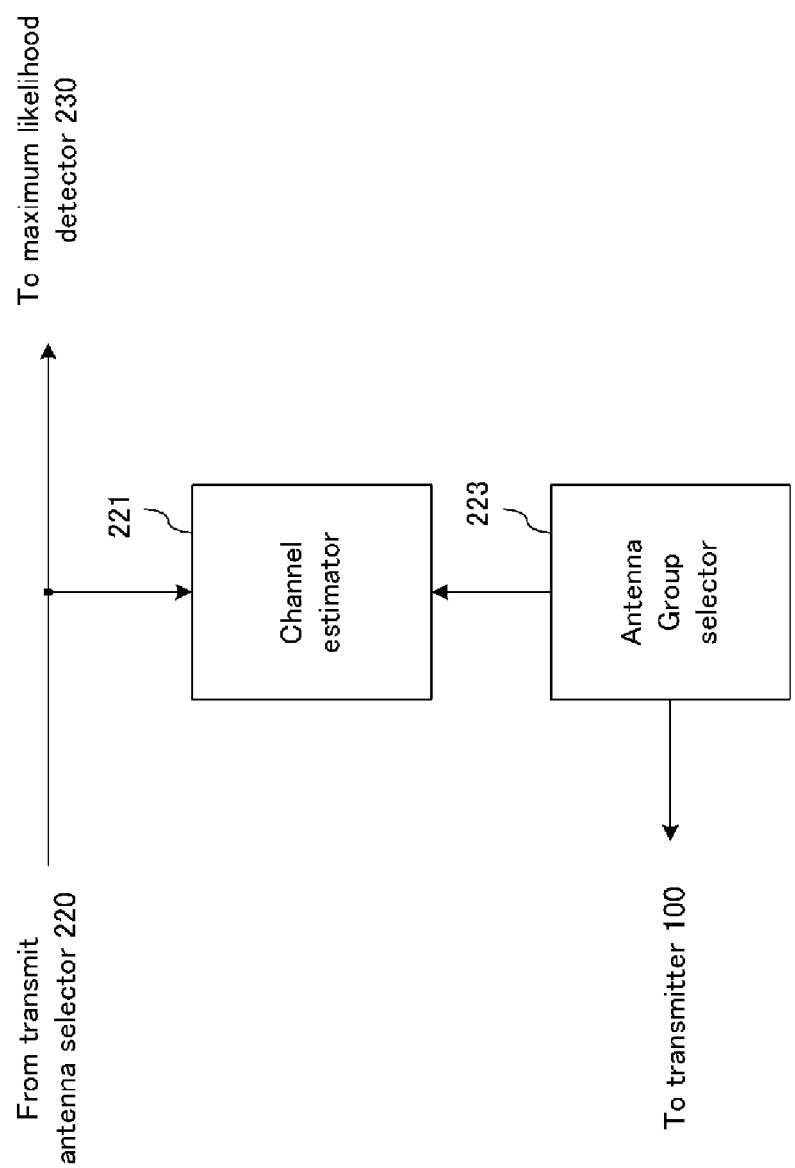

[Fig. 5]
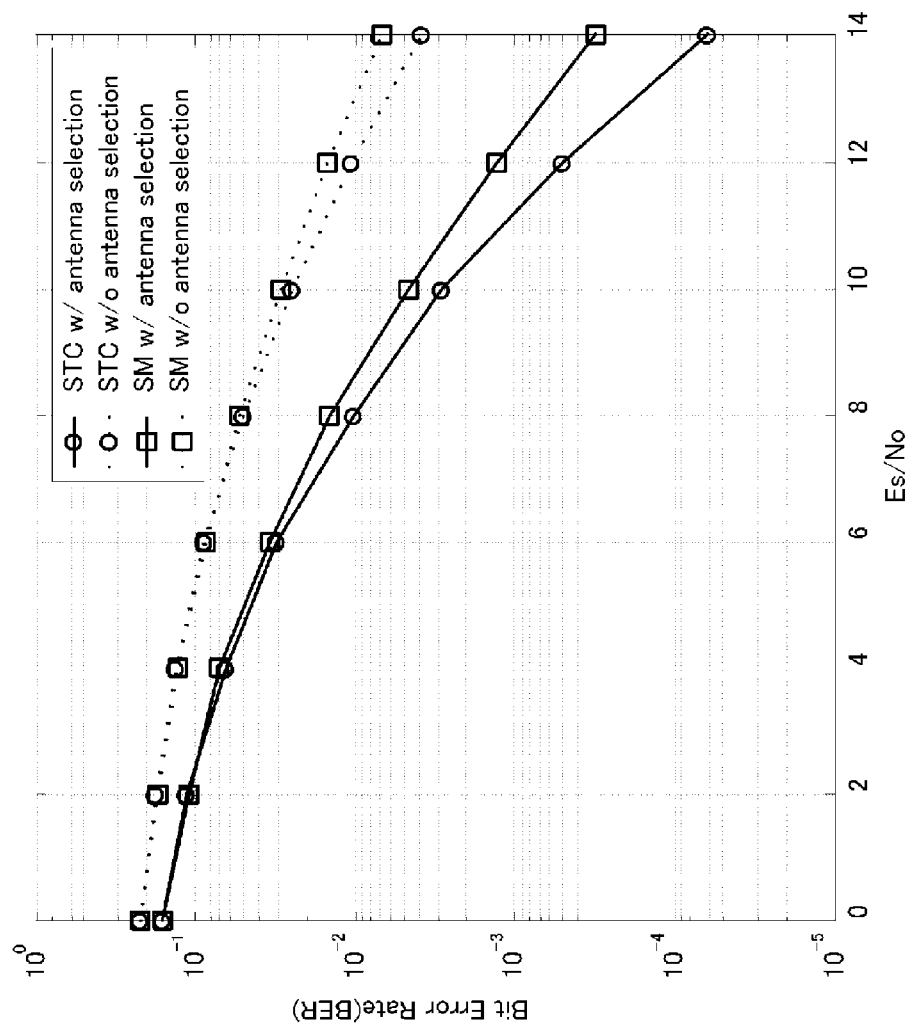

MULTI-INPUT MULTI-OUTPUT SYSTEM FOR ENHANCING TRANSMISSION PERFORMANCE

CROSS REFERENCE TO RELATED APPLICATIONS

This application is based on and claims priority to International Application PCT/KR2005/002592 filed and Korean application No. 10-2004-0092587 filed Nov. 12, 2004, the disclosures of which are hereby incorporated herein by reference.

TECHNICAL FIELD

The present invention relates to a multi-input multi-output (MIMO) system for enhancing transmission performance. More specifically, the present invention relates to a MIMO system for enhancing transmission performance by transmitting space-time encoded symbols through transmission antennas selected according to quality of a transmission channel.

BACKGROUND ART

In general, a transmission efficiency of a communication system may be greatly increased without increasing bandwidth and power in a multi-input multi-output (MIMO) method using multiple antennas at a respective transmitter and receiver. The MIMO method is classified into an open-loop method and a closed-loop method. A transmitter does not know channel information in the open-loop method, and the transmitter knows the channel information and transmits an information symbol appropriate to a channel by using the channel information in the closed-loop method.

The open-loop MIMO method is classified into space division multiplexing, transmit diversity, and space-time encoding methods according to a diversity gain and a space division multiplexing gain.

The space division multiplexing method is for transmitting symbols different from each other through respective transmit antennas, and a data rate may be increased according to the number of transmit antennas since information symbols of as many as the transmit antennas are transmitted for one symbol period in the space division multiplexing method. However, a bit error rate is problematically increased since power is divided and supplied to the respective transmit antennas.

In addition, the transmit diversity method is for repeatedly transmitting the same or similar information symbols through the respective transmit antennas. Accordingly, a bit error rate is achieved of less than the bit rate in a case of using a single antenna since the same or similar information symbols are transmitted through various paths and channel fading is effectively overcome in the transmit diversity method. However, it is difficult to achieve a data rate as high as the data rate in the space division multiplexing method since one symbol is transmitted for one symbol period by repeatedly transmitting the same symbols from the respective transmit antennas.

To solve the problems of the space division multiplexing method and the transmit diversity method, the space time coding method with a high data rate and stable symbol transmission has been suggested. The transmitter transmits a transmission symbol column encoded into a space-time matrix to a receiver through multiple antennas in order to increase the data rate in the space time coding method. Among the space time coding methods, a full rate full diversity (FDFR) coding method has been suggested and applied to the MIMO system required for a high data rate. The bit error rate is reduced by increasing the data rate according to the number of transmit antennas and achieving the diversity gain and the coding gain in the FEFR coding method (refer to "A construction of a space time code based on number theory", IEEE Transaction on Information Theory, vol. 48, No. 3. pp 753-760, March 2002; M. O. Damen, A. Tewfix, J. C. Belfiore).

As described, the space time coding method is suitable for a next generation communication system required for a high data rate since a space time code is designed to maintain the same data rate as the space division multiplexing method while obtaining a maximum diversity gain and a coding gain. However, performance for detecting a signal is reduced since the diversity gain is reduced and a signal to noise ratio of a space division multiplexing symbol is steeply reduced when correlativity of channels is increased.

In addition, the closed-loop MIMO method is classified into a full channel regression method and a partial channel regression method according to a quantity of the channel information returned from the receiver.

An adaptive modulation method that varies modulation methods according to respective channel qualities for respective antennas may be applied since the transmitter knows the channel information in the full channel returning method, and accordingly a maximum channel capacity may be obtained. However, there is a problem in that a lot of frequency resources are wasted for returning the channel information.

In the partial channel regression method, information adapted to channels by using a few frequency resources may be transmitted since the receiver extracts and processes characteristics of a channel and returns the extracted and processed channel to the transmitter. A transmit antenna selection method is a representative example of the partial channel regression method, in which a diversity gain and a signal to noise ratio are obtained by selecting transmit antenna groups of a good channel quality and transmitting an information symbol through the selected antennas (refer to R. W. Heath, A. Paulaj; Antenna selection for spatial multiplexing systems based on minimum error rate, ICC 2001, vol. 7, pp 11-14, June 2002).

According to the transmit antenna selection method, a diversity gain may be obtained to be higher than the transmission diversity method by selecting antennas having a high channel gain and low channel correlativity and transmitting the information through the selected antennas. In addition, an increase of a noise power is effectively prevented and the diversity gain is concurrently obtained since the channel correlativity is increased by combining the transmit antenna selection method with the space division multiplexing method.

Accordingly, a method for applying the space time encoding method of the open-loop MIMO method to the transmit antenna selection method of the closed-loop MIMO method is required.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

DISCLOSURE OF INVENTION

Technical Problem

The present invention provides a method for enhancing transmission performance by combining a transmit antenna selection method of a closed-loop MIMO method with a space time coding method of an open-loop MIMO method so as to select transmit antennas having less space correlativity of channels and a great channel gain and to transmit encoded symbols.

Technical Solution

An exemplary transmitter of a MIMO system according to an exemplary embodiment of the present invention includes N transmit antennas, a space time encoder, and an antenna switch. The N transmit antennas are more than M transmit antennas used for transmitting a signal to a space channel (M is a natural number, and N is a natural number greater than M). The space time encoder space-time encodes a symbol to be transmitted and outputs a space-time code corresponding to the space-time encoded symbol. The antenna switch selects the M transmit antennas among the N transmit antennas with reference to transmit antenna selection information returned from a receiver of the MIMO system of the space-time encoding method, and transmits the space-time code outputted by the space time encoder to the M selected transmit antennas.

In a further embodiment, a receiver of a MIMO system includes M receive antennas, a maximum likelihood detector, and a transmit antenna selector coupled between the receive antenna and the maximum likelihood detector. The M receive antennas correspond to the number of receive antennas used for receiving a signal from a space channel (M is a natural number). The maximum likelihood detector detects an information symbol having a minimum Euclidean distance by substituting information symbols for the signals received through the receive antennas. The transmit antenna selector estimates a channel by using the signal received through the receive antennas, generates transmit antenna selection information for selecting M transmit antennas among N transmit antennas (N is a natural number greater than M) in a transmitter of the MIMO system with reference to an estimated channel estimate, and returned the transmit antenna selection information to the transmitter.

At this time, the transmit antenna selection information generated by the transmit antenna selector is information on a predetermined index when the number of cases for selecting the M transmit antennas from the N transmit antennas is established to correspond to the predetermined index.

In another further embodiment, a MIMO system includes a transmitter including N transmit antennas that are more than M transmit antennas used for transmitting a signal to a space channel (M is a natural number, and N is a natural number greater than M), and a receiver including M receive antennas for receiving a signal from a space channel. The transmitter selects the M transmit antennas among the N transmit antennas, and transmits a symbol by space-time encoding the symbol to be transmitted. The receiver detects an information symbol by using the signal received through the receive antenna, generates transmit antenna selection information for selecting M transmit antennas among N transmit antennas with reference to a channel estimate estimated from the received signal, and returns the transmit antenna selection information to the transmitter.

At this time, the transmit antenna selection information is selected with reference to a channel for maximizing capacity of the channel receiving the signal, and is selected with reference to a standard for maximizing a determinant of the channel when a signal to noise ratio is great and a logarithm function has a characteristic of monotonic increase.

ADVANTAGEOUS EFFECTS

According to the present invention, performance of a space time encoder may be increased by combining a space time coding method with a transmit antenna selecting method.

In addition, a bit error rate of the space time encoder may be greatly improved since a diversity gain of the space time encoder is optimized and a signal to noise ratio gain is increased by using the transmit antenna selection method for selecting transmit antennas having a maximum channel determinant.

BRIEF DESCRIPTION OF THE DRAWINGS

FIG. 1 shows a diagram for representing a MIMO system including a conventional space time encoder.

FIG. 2 shows a diagram for representing a MIMO system according to an exemplary embodiment of the present invention.

FIG. 3 shows a block diagram of a configuration of an antenna switch shown in FIG. 2.

FIG. 4 shows a block diagram of a configuration of a transmit antenna selector shown in FIG. 2.

FIG. 5 shows a graph for comparing performance between a MIMO system according to an exemplary embodiment of the present invention and other systems.

BEST MODE FOR CARRYING OUT THE INVENTION

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. Like reference numerals designate like elements throughout the specification.

FIG. 1 shows a diagram for representing a MIMO system including a conventional space time encoder.

As shown in FIG. 1, a transmitter 10 and a receiver 20 in a MIMO system including a conventional space time encoder respectively use two transmit antennas 14-1 and 14-2 and two receive antennas 22-1 and 22-4.

The transmitter 10 includes a space time encoder 12 for transmitting transmission symbols $S_1$, $S_2$, $S_3$, and $S_4$ through the transmit antennas 14-1 and 14-2 by space-time encoding the transmission symbols, and the receiver 20 includes a maximum likelihood detector 24 for detecting information symbols $\hat{S}_1$, $\hat{S}_2$, $\hat{S}_3$, and $\hat{S}_4$ from symbols received through the receive antennas 22-1 and 22-4.

The space time encoder 12 of the transmitter 10 forms a space time code (STC) B by using four transmission symbols S1, S2, S3, and S4 as shown in Math FIG. 1.

$$B = \frac{1}{\sqrt{2}} \begin{pmatrix} S_1 + \phi S_2 & \theta(S_3 + \phi S_4) \\ \theta(S_3 - \phi S_4) & S_1 - \phi S_2 \end{pmatrix} \qquad \text{MathFigure 1}$$

In the space time code B, elements in first and second rows respectively denote space-time encoded symbols transmitted from first and second transmit antennas 14-1 and 14-2, and elements in first and second columns respectively denote space-time encoded symbols transmitted from the first and second transmit antennas 14-1 and 14-2 for first and second symbol times.

In addition, θ and ø respectively have configurations of $θ^2=ø$ and $ø=e^{jλ}$ in the space time code B, and performance of the space time encoder 12 is controlled by a space time design element ø.

The space time encoder 12 is required to be designed to minimize an error rate on detecting a signal, and ø is determined by using a rank design standard and a determinant design standard so as to minimize the error rate.

The rank design standard is for designing a minimum rank of a difference matrix between two arbitrary space-time codes to be maximized, and the diversity gain is determined by the minimum rank. A slope of a bit error rate curve is determined by the diversity gain, and a reduction width in a bit error rate is increased since the signal to noise ratio is increased as the diversity gain becomes higher. In a space time encoder using the full rate full diversity (FDFR) coding method, the minimum rank is designed to correspond to the number of the transmit antennas.

In addition, the determinant design standard is for designing a minimum determinant of the difference matrix between two arbitrary space-time codes to be maximized, and a coding gain is determined by the minimum determinant. The coding gain is shown as a gain of the signal to noise ratio in a bit error rate curve.

The space time encoder 12 may achieve a full rate for transmitting two symbols corresponding to the number of the antennas (i.e., 2) for a symbol time since it transmits four symbols for two symbol times, and the space time encoder 12 may also achieve a full diversity gain since it satisfies a design standard of the space time encoder.

The receiver 20 uses the maximum likelihood detector 24 for selecting a combination of symbols having a minimum Euclidean distance among possible combinations of the symbols so as to maximize the space-time encoding diversity gain.

As described, there is a problem in that the diversity gain is reduced and the signal to noise ratio of the space division multiplexing symbol is steeply reduced as the channel correlativity is increased in the open-loop MIMO system including the space time encoder 12, and therefore the transmit antenna selection method of the closed-loop method is applied in the open-loop MIMO system including the space time encoder 12 to solve the problem.

The open-loop MIMO system including the space time encoder in which the closed-loop transmit antenna selection method according to the exemplary embodiment of the present invention is applied will be now described with reference to figures.

A signal matrix received through the receive antenna of the receiver in the MIMO system using the space time encoder is a linear combination of a channel and a space-time code and is shown as Math FIG. 2.

$$Y = \sqrt{\frac{\rho}{2}} H_p B + N, \quad \text{MathFigure 2}$$

where ρ denotes a reception signal to noise ratio, N denotes a 2×2 complex Gaussian noise matrix having 0 as an average and 1 as a variance of respective elements, and $H_p$ denotes a channel formed between a receive antenna and two transmit antennas selected from more than three transmit antennas.

The received signal matrix of Math FIG. 2 may be vectored as shown in Math FIG. 3.

$$y = vec(Y) = \sqrt{\frac{\rho}{2}} \begin{pmatrix} H_p & 0_{2\times 2} \\ 0_{2\times 2} & H_p \end{pmatrix} \Phi s + vec(N) \quad \text{MathFigure 3}$$

$$= \sqrt{\frac{\rho}{2}} \mathcal{H}_e s + n$$

At this time, $$\mathcal{H}_e = \begin{pmatrix} H_p & 0_{2\times 2} \\ 0_{2\times 2} & H_p \end{pmatrix} \Phi$$

is a converted channel, and a unitary matrix Φ and a transmission symbol vector s are formed as shown in Math FIG. 4.

$$\Phi = \frac{1}{\sqrt{2}} \begin{pmatrix} 1 & \phi & 0 & 0 \\ 0 & 0 & \theta & -\theta\phi \\ 0 & 0 & \theta & \theta\phi \\ 1 & -\phi & 0 & 0 \end{pmatrix}, s = [s_1 \; s_2 \; s_3 \; s_4]^T \quad \text{MathFigure 4}$$

Math FIG. 3 shows a relation between a received signal vector and an information symbol vector. An instantaneous channel capacity of $H_p$ is shown as Math FIG. 5.

$$C_p = \log_2(\det(I_{2\times 2} + \frac{\rho}{2} H_p H_p^H)) \quad \text{MathFigure 5}$$

In the exemplary embodiment of the present invention, the receiver of the MIMO system selects an index p representing a group of transmit antennas maximizing the instantaneous channel capacity among the channels $H_p$ corresponding to the group of two transmit antennas selected from more than three transmit antennas, and returns the selected index p to the transmitter.

Assuming that the signal to noise ratio is great and considering that a logarithm function has a characteristic of monotonic increase in the instantaneous channel capacity shown in Math FIG. 5, a standard for maximizing the instantaneous channel capacity corresponds to a standard for maximizing a channel determinant.

As a result, a standard for selecting the transmit antenna by the receiver is as shown in Math FIG. 6.

$$\max_p \; \det(H_p H_p^H) \quad \text{MathFigure 6}$$

The index p of the group of transmit antennas determined by the receiver is returned to the transmitter, and a group of the transmit antennas is determined based on the returned regression information and the space-time code is transmitted by using the determined transmit antennas by the transmitter.

The transmit antenna selection standard according to the exemplary embodiment of the present invention may be expansively applied to an arbitrary space-time encoding method represented by the channel having the received signal vector modulated as shown in Math FIG. 3 and a linear combination of the transmission symbol vectors. The expansively applied transmit antenna selection standard is as shown in Math FIG. 7.

$$\max_{p} \det(\mathcal{H}_{p} H_{p}^{H})$$  MathFigure 7

The antenna selection standard shown in Math FIG. 6 may be applied when the converted channel H p, among the space-time encoding methods represented by the linear combination of the converted channel and the transmission symbol vectors, is represented by a product of the unitary matrix and the block-diagonalized channel matrix as shown in Math FIG. 3.

FIG. 2 shows a block diagram for representing the MIMO system according to the exemplary embodiment of the present invention As shown in FIG. 2, the MIMO system according to the exemplary embodiment of the present invention includes a transmitter 100 for transmitting space-time encoded symbols after selecting two channels among more than three channels, and a receiver 200 for detecting information symbols from signals received through the two channels, and returning information for selecting two channels through which signals are transmitted by the transmitter 100 after estimating channels from the received signal and determining the information.

The transmitter 100 includes a space time encoder 110, an antenna switch 120, and transmit antennas 130-1, 130-2, 130-3, and 130-4.

While it is described assuming that the transmitter 100 transmits symbols to the receiver 200 through the two channels in the exemplary embodiment of the present invention, the symbols may be transmitted through more than three channels.

Since it is assumed that the symbols are transmitted through two channels between the transmitter 100 and the receiver 200, the transmitter 100 may select two transmit antennas when it has more than three transmit antennas. In the exemplary embodiment of the present invention, the transmitter 100 includes four transmit antennas 130-1, 130-2, 130-3, and 130-4, and two transmit antennas are selected among the four transmit antennas 130-1, 130-2, 130-3, and 130-4 when the symbols are transmitted. In FIG. 2, the transmit antennas 130-1 and 130-3 illustrated with a solid line are the two selected transmit antennas in the exemplary embodiment of the present invention, and the transmit antennas 130-2 and 130-3 illustrated with a dotted line are the transmit antennas which are not selected.

The space time encoder 110 generates the space-time code B shown in Math FIG. 1 from a symbol column $S_1, S_2, S_3$, and $S_4$ inputted for transmission and outputs it to the antenna switch 120. At this time, the space time encoder 110 performs space-time encoding according to a modulation method by using a parameter ø optimized by the rank design standard and the determinant design standard.

The antenna switch 120 selects two transmit antennas from the transmit antennas 130-1, 130-2, 130-3, and 130-4 according to the channel selection information (i.e., transmit antenna selection information) returned from the receiver 200, and transmits the space-time code B outputted by the space time encoder 110 to a space channel through the selected transmit antennas.

In the exemplary embodiment of the present invention, the receiver 200 selects a transmit antenna group of two transmit antennas, and transmits information on the group to the antenna switch 120 of the transmitter 100.

For example, the transmit antenna group includes four transmit antennas 130-1, 130-2, 130-3, and 130-4. Assuming that 1, 2, 3, and 4 respectively denote the four transmit antennas 130-1, 130-2, 130-3, and 130-4, there are six combinations for selecting two transmit antennas from the four transmit antennas as shown in Table 1.

TABLE 1

| | Index | | | | | |
|---|---|---|---|---|---|---|
| | 1 | 2 | 3 | 4 | 5 | 6 |
| Transmission antenna group | (1, 2) | (1, 3) | (1, 4) | (2, 3) | (2, 4) | (3, 4) |

For example, a transmit antenna group of (1, 4) is selected in a case that the receiver 200 selects an index no. 3 transmit antenna group, which means that two transmit antennas 130-1 and 130-4 are selected by the antenna switch 120 of the transmitter 100. As shown in FIG. 2, two transmit antennas 130-1 and 130-3 (i.e., transmit antennas 1 and 3 in Table 1) are selected, and therefore an index no. 2 transmit antenna group is selected and returned to the antenna switch 120 of the transmitter 100 by the receiver 200.

The antenna switch 120 may be formed as shown in FIG. 3.

FIG. 3 shows a block diagram of a configuration of the antenna switch 120 shown in FIG. 2.

As shown in FIG. 3, the antenna switch 120 includes an antenna group encoder 121 and a switch 123.

Since the information returned from the receiver 200 is the antenna group information as shown in Table 1, the antenna group encoder 121 encodes the returned information into information for selecting two transmit antennas and outputting the encoded information to the switch 123.

The switch 123 controls the space-time code outputted from the space time encoder 110 to be transmitted to two transmit antennas among the four transmit antennas 130-1, 130-2, 130-3, and 130-4 by switching on the two transmit antennas according to the information on the two transmit antennas outputted from the antenna group encoder 121.

The receiver 200 includes receive antennas 210-1 and 210-2, a transmit antenna selector 220, and a maximum likelihood detector 230.

The receive antennas 210-1 and 210-2 receive signals transmitted from the transmitter 100 and transmit the received signals to the transmit antenna selector 220 through the space channel.

The transmit antenna selector 220 transmits the signal received from the receive antennas 210-1 and 210-2 to the maximum likelihood detector 230. The transmit antenna selector 220 also selects a transmit antenna group corresponding to a channel maximizing the instantaneous channel capacity by estimating the channel by using the received signal, and returns index information of the selected transmit antenna group to the antenna switch 120 of the transmitter 100.

The maximum likelihood detector 230 detects information symbols $\hat{S}_1, \hat{S}_2, \hat{S}_3,$ and $\hat{S}_4$ having a minimum Euclidean distance by substituting information symbols for the received signal transmitted from the transmit antenna selector 220.

The transmit antenna selector 220 may be formed as shown in FIG. 4.

FIG. 4 shows a block diagram of a configuration of the transmit antenna selector shown in FIG. 2.

As shown in FIG. 4, the transmit antenna selector 220 includes a channel estimator 221 and an antenna group selector 223.

The channel estimator 221 estimates channels between multiple antennas by using the signal received from the receive antennas 210-1 and 210-2, and transmits an estimated channel estimate to the antenna group selector 223.

The antenna group selector 223 determines the channel maximizing the instantaneous channel capacity (i.e., a channel maximizing the determinant) by using the channel estimate transmitted from the channel estimator 221, selects an index of the transmit antenna group corresponding to the channel, and returns index information on the selected transmit antenna group to the antenna switch 120 of the transmitter 100. At this time, the antenna group selector 223 may selects a transmit antenna group by using Math FIG. 6 or Math FIG. 7.

An operation of the MIMO system according to the exemplary embodiment of the present invention will now be described.

The space time encoder 110 receives symbols $S_1$, $S_2$, $S_3$, and $S_4$ to be transmitted to the receiver 200 by the transmitter 100 in the MIMO system according to the exemplary embodiment of the present invention.

The received symbols $S_1$, $S_2$, $S_3$, and $S_4$ are encoded by the space time encoder 110 into a space-time code B to be transmitted through the two transmit antennas as shown in Math FIG. 1, and are outputted to the antenna switch 120.

Index information of a group of two transmit antennas among the transmit antennas 130-1, 130-2, 130-3, and 130-4 selected by the transmit antenna selector 220 of the receiver 200 is returned to the antenna switch 120 of the transmitter 100 by the previous symbol transmission, the antenna switch 120 selects transmit antennas corresponding to the returned index information among the transmit antennas 130-1, 130-2, 130-3, and 130-4.

In further detail, the index information returned from the receiver 200 is encoded into information on two transmit antennas corresponding to the index information, and is transmitted to the switch 123. For example, when the index information on transmit antenna group 2 is returned from the receiver as shown in FIG. 2, the antenna group encoder 121 generates information showing that the transmit antennas corresponding to the index no. 2 are transmit antenna 130-1 and 130-3 with reference to Table 1, and transmits the information to the switch 123. The switch 123 selects and switches on two transmit antennas among the four transmit antennas 130-1, 130-2, 130-3, and 130-4 with reference to the information transmitted from the antenna group encoder 121.

Accordingly, the space-time code B inputted from the space time encoder 110 to the antenna switch 120 is transmitted to the two transmit antennas selected by the switch 123 of the antenna switch 120, and is transmitted as a signal corresponding to space-time code B through the channel maximizing the channel capacity to the receiver 200.

The signal transmitted to the space channel through the two selected transmit antennas of the transmitter 100 is received through the two receive antennas 210-1 and 210-2 of the receiver 200, and is transmitted to the transmit antenna selector 220.

The transmitted signal is transmitted to the maximum likelihood detector 230 by the transmit antenna selector 220 and is used for the channel estimation by the channel estimator 221.

The maximum likelihood detector 230 detects information symbols
$\hat{S}_1$, $\hat{S}_2$, $\hat{S}_3$, and $\hat{S}_4$
having a minimum Euclidean distance by substituting information symbols for the signal transmitted from the transmit antenna selector 220.

The antenna group selector 223 selects two transmit antennas among the four transmit antennas 130-1, 130-2, 130-3, and 130-4 based on a standard for maximizing a channel determinant according to the channel estimate estimated by the channel estimator 221 of the transmit antenna selector 220, and returns the index information on a transmit antenna group of the selected transmit antennas to the antenna switch 120 of the transmitter 100.

FIG. 5 shows a graph for comparing performance between the MIMO system according to the exemplary embodiment of the present invention and other systems.

As shown in FIG. 5, a curve illustrated by a solid line with circles shows performance of the MIMO system in the space-time encoding method using the transmit antenna selection method according to the exemplary embodiment of the present invention, a curve illustrated by a broken line with circles shows performance of the MIMO system in the space-time encoding method without using the transmit antenna selection method, a curve illustrated by a solid line with squares shows performance of the MIMO system in the space division multiplexing method using the transmit antenna selection method, and a curve illustrated by a broken line with squares shows performance of the MIMO system in the space division multiplexing method without using the transmit antenna selection method.

Herein, a group of two transmit antennas maximizing the channel determinant is selected among the four antennas in the transmit antenna selection method, and two transmit antennas are used when the transmit antenna selection method is not used.

In the space-time encoding method, a quadrature-phase-shift-keying symbol converted by the transmitter is transmitted after the symbol is space-time encoded according to Math FIG. 1, and the symbol is detected by the maximum likelihood detector in the receiver.

In the space division multiplexing method, the quadrature-phase-shift-keying symbol converted by the transmitter is transmitted after the symbol is space division multiplexed for respective transmit antennas, and the symbol is detected by using the maximum likelihood detector in the receiver.

As shown in FIG. 5, a diversity gain of the MIMO system using the space-time coding (STC) method is greater than the same of the MIMO system using the space division multiplexing method, and a signal to noise ratio and a diversity gain of the MIMO system in the STC method using the transmit antenna selection method are greater than the same of the MIMO system in the STC method without using the transmit antenna selection method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

In the foregoing, I is an identity matrix, O is a zero matrix, a superscript "H" denotes a hermitian matrix, and a superscript "T" denotes a transposed matrix.

The invention claimed is:

1. A receiver of a multi input multi output system (MIMO) in a space-time encoding method comprising:
M receive antennas corresponding to a number of receive antennas used for receiving a signal from a space channel (M is a natural number);
a maximum likelihood detector for detecting an information symbol having a minimum Euclidean distance by substituting information symbols for the signals received through the receive antennas; and
a transmit antenna selector coupled between the receive antennas and the maximum likelihood detector, the transmit antenna selector for estimating a channel by using the signals received through the receive antennas, generating transmit antenna selection information for selecting M transmit antennas among N transmit antennas (N is a natural number greater than M) in a transmitter of the MIMO system with reference to an estimated channel estimate, and returning the transmit antenna selection information to the transmitter.
wherein the receiver selects the M transmit antennas corresponding to a channel maximizing channel capacity by using the channel estimate, and
wherein the channel capacity Cp is satisfied with the equation $$C_p = \log_2\left(\det\left(I_{2\times 2} + \frac{\rho}{2} H_p H_p^H\right)\right)$$

wherein $I_{2\times 2}$ denotes a 2×2 identity matrix, $H_P$ denotes a channel matrix, and $H_P^H$ denotes a hermitian matrix of the $H_P$ matrix,
when a vector value y of the signals received through the receive antennas satisfies the equation:

$$y = vec(Y) = \sqrt{\frac{\rho}{2}} \begin{pmatrix} H_p & 0_{2\times 2} \\ 0_{2\times 2} & H_p \end{pmatrix} \Phi s + vec(N)$$
$$= \sqrt{\frac{\rho}{2}} \mathcal{H}_F s + n$$

wherein $O_{2\times 2}$ denotes a 2×2 zero matrix, $\phi$ denotes a space-time design element, and s denotes a transmission symbol,
where $\rho$ denotes a reception signal to noise ratio, Hp denotes a channel formed between the receive antennas and the transmit antennas, and $$\Phi = \frac{1}{\sqrt{2}} \begin{pmatrix} 1 & \phi & 0 & 0 \\ 0 & 0 & \theta & -\theta\phi \\ 0 & 0 & \theta & \theta\phi \\ 1 & -\phi & 0 & 0 \end{pmatrix}, s = [s_1\ s_2\ s_3\ s_4]^T$$

wherein T denotes a transposed matrix and $\theta$ denotes $\sqrt{\phi}$.

2. The receiver of claim 1, wherein the standard for maximizing the channel capacity satisfies $$\max_p \det(H_p H_p^H).$$

3. The receiver of claim 1, wherein a converted channel CHp of the channel Hp satisfies the $$C H_p = \begin{pmatrix} H_p & 0_{2\times 2} \\ 0_{2\times 2} & H_p \end{pmatrix} \Phi,$$

and the standard for maximizing the channel capacity satisfies $$\max_p \det(\mathcal{H}_F H_p^H)$$

when the vector value y of the received signal is a linear combination of the converted channel and the transmission symbol vector s.

* * * * *